United States Patent
Park

(10) Patent No.: US 8,144,350 B2
(45) Date of Patent: Mar. 27, 2012

(54) IMAGE FORMING APPARATUS AND METHOD OF CONTROLLING THE SAME

(75) Inventor: Young Jin Park, Bucheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1085 days.

(21) Appl. No.: 12/016,239

(22) Filed: Jan. 18, 2008

(65) Prior Publication Data

US 2008/0198238 A1 Aug. 21, 2008

(30) Foreign Application Priority Data

Feb. 15, 2007 (KR) .................. 10-2007-0016012

(51) Int. Cl.
*H04N 1/04* (2006.01)
(52) U.S. Cl. .............. 358/1.15; 358/1.16; 358/1.9
(58) Field of Classification Search .......... 358/456, 358/474, 1.15, 1.16, 1.2, 1.9, 3.04, 3.09
See application file for complete search history.

(56) References Cited

U.S. PATENT DOCUMENTS

| | | | |
|---|---|---|---|
| 5,535,343 A | 7/1996 | Verseput | |
| 5,740,028 A | 4/1998 | Sugiyama et al. | |
| 6,014,063 A | 1/2000 | Liu et al. | |
| 6,441,915 B1 | 8/2002 | Imaizumi et al. | |
| 6,498,617 B1 * | 12/2002 | Ishida et al. | 347/252 |
| 6,546,048 B1 | 4/2003 | Ichiba et al. | |
| 7,062,579 B2 | 6/2006 | Tateyama et al. | |
| 7,064,859 B1 | 6/2006 | Dittrich et al. | |
| 7,154,489 B2 | 12/2006 | Abe et al. | |
| 7,480,930 B2 | 1/2009 | Ihara | |
| 2003/0020936 A1 | 1/2003 | Nakajima et al. | |
| 2008/0192279 A1 | 8/2008 | Kim | |

FOREIGN PATENT DOCUMENTS

| | | |
|---|---|---|
| DE | 19860909 | 9/1999 |
| EP | 1248394 | 10/2002 |
| JP | 2001-219607 | 8/2001 |
| JP | 2001-309136 | 11/2001 |
| JP | 2004-164293 | 6/2004 |
| WO | WO 02/30674 | 4/2002 |

OTHER PUBLICATIONS

Extended European Search Report, mailed Jan. 22, 2010, in corresponding European Application No. 08100823.7 (14 pp.).
Office Action issued in European Patent Application No. 08100903.7 dated Jun. 9, 2008.
Office Action issued in U.S. Appl. No. 12/016,235 dated Jun. 1, 2011.
U.S. Appl. No. 12/016,235, filed Jan. 18, 2008, Chi Hun Kim, Samsung Electronics Co., Ltd.

* cited by examiner

*Primary Examiner* — Houshang Safaipour
(74) *Attorney, Agent, or Firm* — Staas & Halsey LLP

(57) ABSTRACT

An image forming apparatus including a video controller that increases or reduces a pulse width of video data when video data is generated in synchronization with a video clock so as to vary a frequency of the video data. It is possible to effectively cope with emission of electromagnetic waves (electromagnetic interference) whose frequency increases when the same type of pulses is repeated, so that the electromagnetic waves are out of the recognition range of a user and image quality is prevented from deteriorating.

20 Claims, 10 Drawing Sheets

FIG. 2A  VCLK

FIG. 2B  Hsync

FIG. 2C  VDO

VP1  VP2

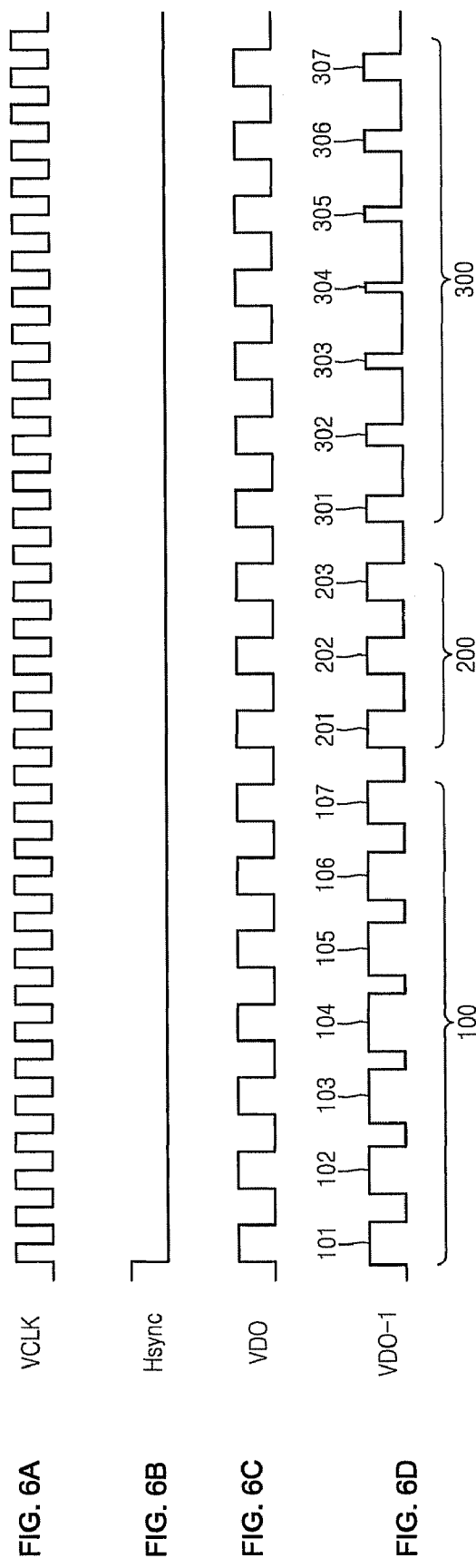

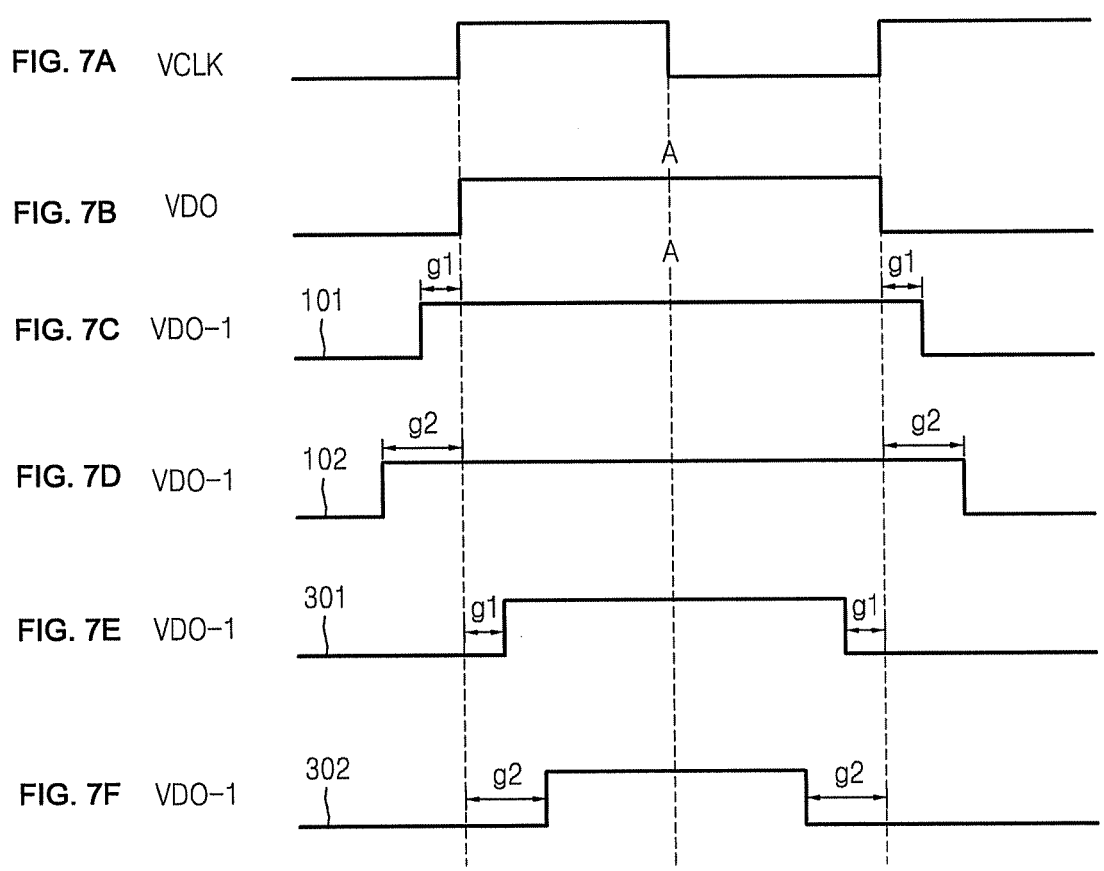

IMAGE FORMING APPARATUS AND METHOD OF CONTROLLING THE SAME

CROSS-REFERENCE TO RELATED APPLICATIONS

This application claims the benefit of Korean Patent Application No. 2007-16012, filed in the Korean Intellectual Property Office on Feb. 15, 2007, the disclosure of which is incorporated herein by reference.

BACKGROUND OF THE INVENTION

1. Field of the Invention

Aspects of the present invention relate generally to an image forming apparatus including a video controller improved to prevent emission of electromagnetic waves from being generated in processes of generating video data in synchronization with a video clock and a method of controlling the same.

2. Description of the Related Art

An image forming apparatus, such as a laser printer and a multifunction printer, includes a video controller that converts print data into video data and provides the video data to an exposing unit. An electrostatic latent image is formed in a photosensitive drum by the exposing unit. Toner is supplied to transfer a developed toner image to a sheet supplied by one from a sheet cassette so that the image can be printed onto a printable medium.

As shown in FIG. 1, the image forming apparatus includes a data processing unit 40 connected to a personal computer (PC) 10, a scanner 20, and/or a facsimile 30 to separately receive print data from the PC 10, the scanner 20, and/or the facsimile 30.

The data processing unit 40 processes the print data received from one of the PC 10, the scanner 20, and the facsimile 30 so that a video controller 50 processes the print data. The video controller 50 generates video data VDO with a reference clock and the print data received from the data processing unit 40 to transmit the video data VDO to an exposing unit 60. The exposing unit 60 provides the video data VDO received through a signal cable to a laser diode (not shown).

The video data VDO turns on or off the laser diode and controls the operation of the laser diode so as to form a part of the exposing unit 60 to which the toner is adhered and a part to which the toner is not adhered to correspond to a printed output image. The video controller 50 changes the duty ratio of the video data VDO using an algorithm for converting data to improve image quality and outputs the video data VDO.

The video data VDO, as shown in FIG. 2C, is generated using a video clock VCLK, shown in FIG. 2A, and a horizontal synchronizing signal Hsync, shown in FIG. 2B, that is a basis of scan lines. The video data VDO is toggled or clocked like the video clock VCLK so that electromagnetic interference is generated.

When a first pulse Vf1 and a second pulse Vf2 of the video data VDO are analyzed in a frequency domain, as shown in FIG. 3, a frequency spectrum Vf1 for the first pulse is distributed in a low frequency band and a frequency spectrum Vf2 for the second pulse is distributed in a relatively high frequency band. Since all of the frequency spectrums deviate from a reference value Es for electromagnetic interference determined by an international authority, the safety standard of a product is not satisfied.

According to a conventional method of improving the problems caused by the electromagnetic interference, a spread spectrum clock generator (SSCG) is used. The frequency of the reference clock varies in a predetermined range and the reference clock is provided to prevent an output signal from being similarly generated in the reference clock. The frequency of the reference clock is not fixed but varies so as to prevent the emission of electromagnetic waves.

When the SSCG is applied in order to solve the problems caused by the emission of the electromagnetic waves during the generation of the video data VDO, the frequency of the video clock VCLK must vary. In this case, the video data VDO is not generated normally. Therefore, a process of varying the frequency of the video clock VCLK in a very limited range is used. However, it is difficult to effectively prevent the electromagnetic interference due to the limited range.

SUMMARY OF THE INVENTION

Aspects of the present invention is provide an image forming apparatus in which the frequency of video data generated in synchronization with a video clock varies to effectively prevent emission of electromagnetic waves from being generated and to prevent image quality from deteriorating and a method of controlling the same.

According to an aspect of the present invention an image forming apparatus is provided. The image forming apparatus comprises a data processor to generate video data, and a video controller to provide the video data to an exposing unit. The video controller varies a frequency of the video data synchronized with a video clock and generated to correspond to printed image information.

According to another aspect of the present invention, the video controller increases or reduces a pulse width of primarily modulated video data to perform a secondary modulation when a pulse type of the primarily modulated video data is repeated.

According to another aspect of the present invention, the video controller comprises a ring oscillator to provide a plurality of tap signals having different phase difference times for the video clock and a modulating unit to receive the tap signals and to perform the secondary modulation based on the tap signals.

According to another aspect of the present invention, the modulating unit varies the pulse width based on a pulse center of the primarily modulated video data.

According to another aspect of the present invention, during the secondary modulation the modulating unit combines at least two periods out of an increasing period in which the pulse width increases, a sustain period in which the pulse width is maintained, and a reducing period in which the pulse width is reduced.

According to another aspect of the present invention, the modulating unit periodically varies the pulse width during the secondary modulation.

According to another aspect of the present invention, the modulating unit includes a storage unit to store information related to periods of variation of the pulse width.

According to another aspect of the present invention, the modulating unit includes a storage unit to store information related to setting of a number of tap signals used during the secondary modulation.

According to another aspect of the present invention, a period of the tap signals provided by the ring oscillator is a half period of the video clock and is a multiple of a phase difference time.

According to another aspect of the present invention, the modulating unit distinguishes timings from each other by rising edges or falling edges of the tap signals generated in the period of the tap signals.

According to another aspect of the present invention, a method of controlling an image forming apparatus having a video controller to provide video data to an exposing unit is provided. The method includes performing a primary modulation to generate primarily modulated video data corresponding to printed image information using a video clock and a horizontal synchronizing signal, determining whether performing a secondary modulation in accordance with a pulse type of the primarily modulated video data is necessary, and varying a frequency of the primarily modulated video data to perform the secondary modulation if the secondary modulation is necessary.

According to another aspect of the present invention, the determining of whether performing the secondary modulation is necessary comprises determining that the secondary modulation is necessary when a pulse type of the primarily modulated video data is repeated.

According to another aspect of the present invention, the method further includes previously setting a number of tap signals and periods of variation of a pulse width of the primarily modulated video data in order to perform the secondary modulation.

According to another aspect of the present invention, the performing of the secondary modulation, comprises varying the pulse width of the primarily modulated video data using the set number of tap signals having a phase difference time for the video clock every set period.

According to another aspect of the present invention, the varying of the pulse width of the video data comprises combining at least two periods out of an increasing period in which the pulse width increases, a sustain period in which the pulse width is maintained, and a reducing period in which the pulse width is reduced.

According to another aspect of the invention, the pulse width is increased or reduced at both ends based on a pulse center of the primarily modulated video data during variation of the pulse width.

According to another aspect of the present invention, the variation of the pulse width is performed in a set range.

According to another aspect of the present invention, the set range is ¼ of a period of the video clock.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 illustrates an operation of the video controller according to an embodiment of the present invention secondarily modulating the video data;

FIGS. 7A-7F are timing diagrams illustrating an operation of varying the pulse width of the video data according to an embodiment of the present invention;

DETAILED DESCRIPTION OF THE EMBODIMENTS

Figure 1:
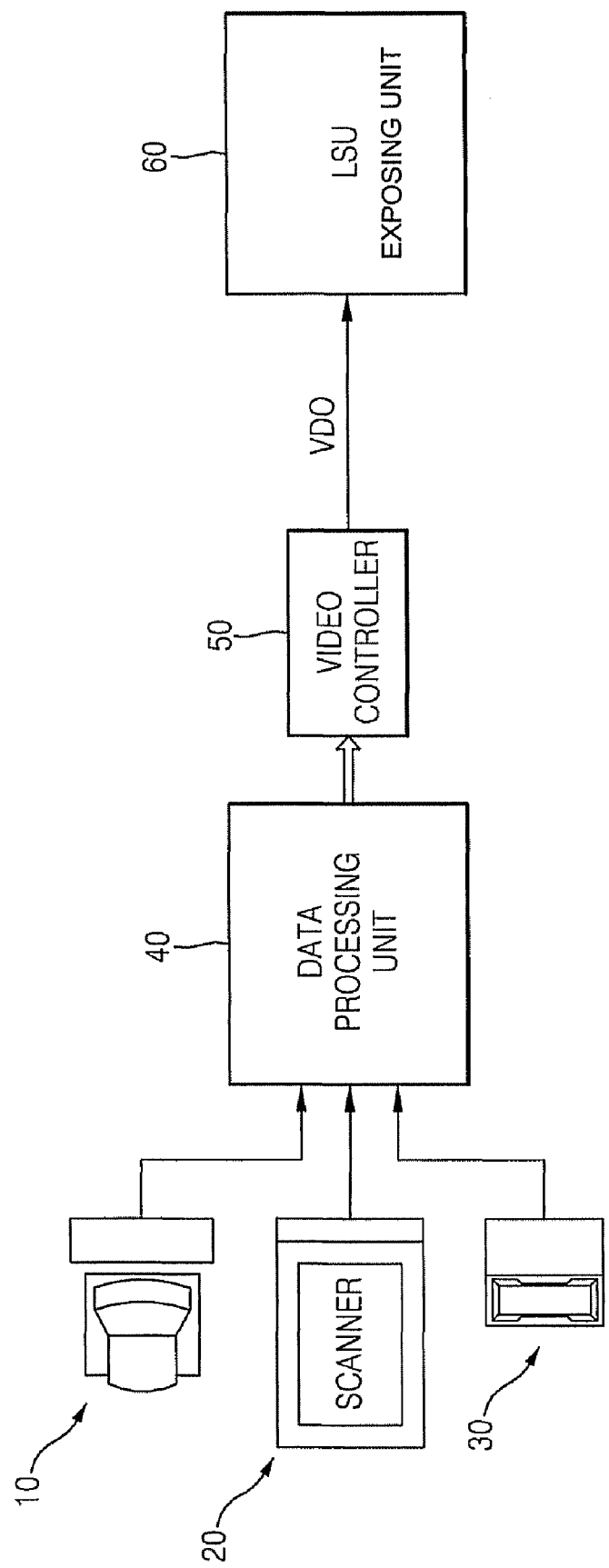
FIG. 1 is a block diagram of an image forming apparatus.
Figure 2:
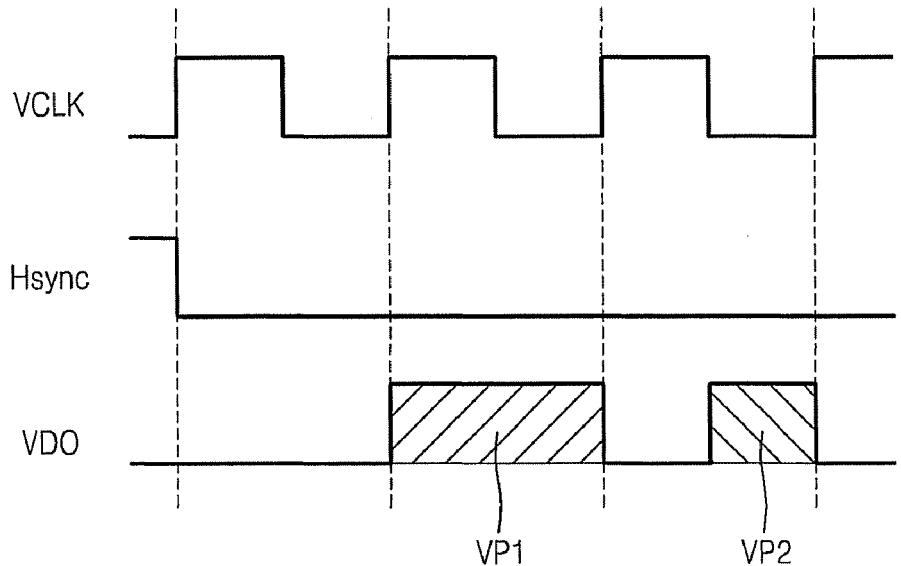
FIGS. 2A-2C illustrate a timing diagram of video data output in synchronization with a video clock.
Figure 3:
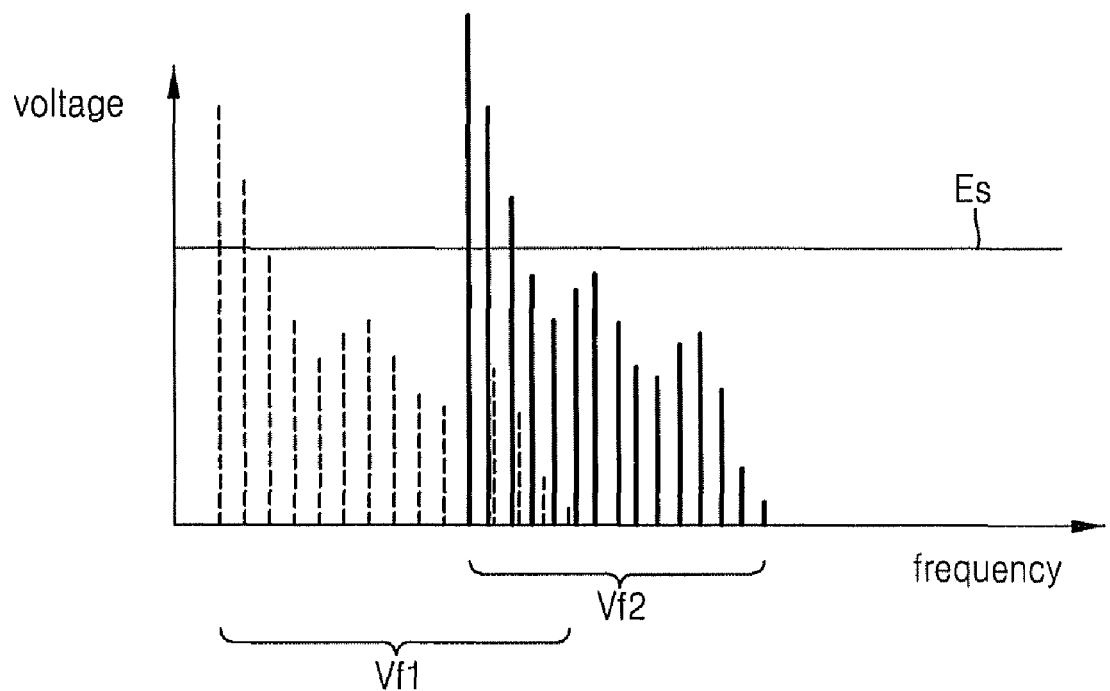
FIG. 3 illustrates the frequency spectrums of the video data.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An image forming apparatus according to an embodiment of the present invention may include the elements shown in FIG. 1 and varies the frequency of video data when the video data is generated by a video controller to solve the problems caused by electromagnetic interference.

Figure 4:
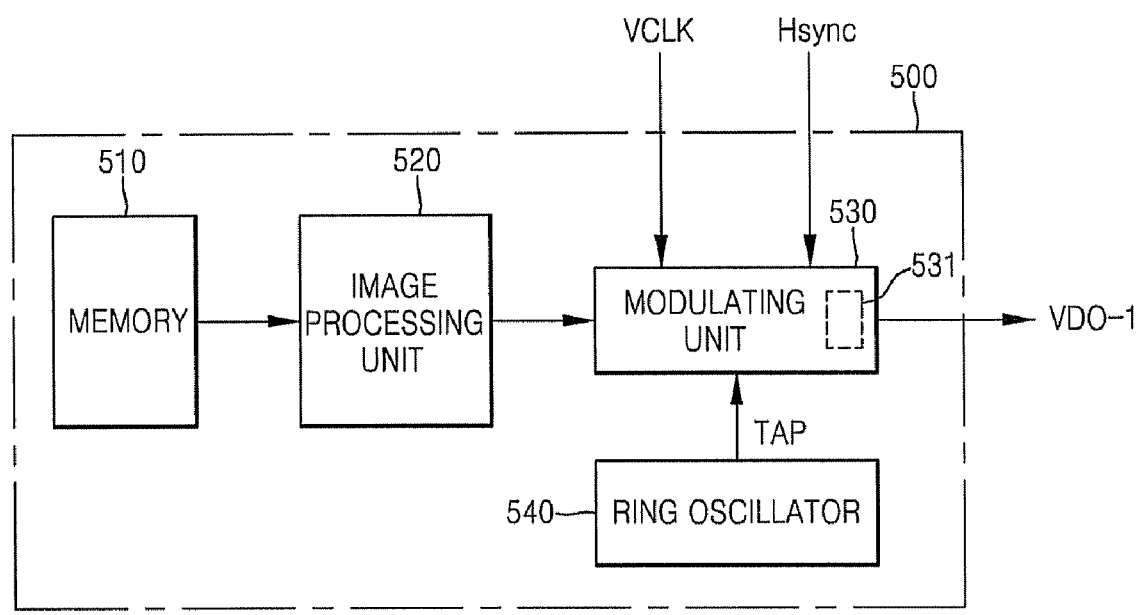
FIG. 4 is a block diagram of an improved video controller according to an embodiment of the present invention.

As shown in FIG. 4, an improved video controller 500 according to an embodiment of the present invention receives print data from a data processing unit 40 and generates video data VDO using a video clock VCLK and a horizontal synchronizing signal Hsync, which is similar to the conventional art. The video controller 500 includes a memory 510, an image processing unit 520, a modulating unit 530, and a ring oscillator 540. According to other aspects of the invention, the video controller may include additional and/or different units. Similarly, the functionality of two or more of the above units may be integrated into a single component.

The memory 510 stores the print data provided from the data processing unit 40 and outputs the print data to the image processing unit 520. The image processing unit 520 performs image processing in order to generate the video data VDO and provides the video data VDO obtained by performing the image processing to the modulating unit 530.

The ring oscillator 540 provides a clock having a frequency higher than the frequency of the video clock VCLK to the modulating unit 530. The modulating unit 530 sets the start, the end, and the pulse width of the video data VDO using the clock of a radio frequency provided from the ring oscillator 540, the video clock VCLK, and the horizontal synchronizing signal Hsync, and outputs the video data VDO. The pulse width is set to correspond to printed image information.

A frequency of generating electromagnetic interference increases where the same type of pulses are repeated among the pulse columns of the video data VDO. As a result, the modulating unit 530 not only depends on image information, but also varies the pulse width where the pulse type of the video data VDO is repeated. Since the pulse of the video data VDO basically corresponds to the image information, when the pulse width varies, the image of a printed output image is damaged so that image quality deteriorates. However, when the pulse width varies in a uniform range (¼ of the video clock VCLK of a period), a user recognizes that the printed output image is reproduced. It is possible to significantly reduce electromagnetic interference since the pulse width varies without significantly affecting the quality of the printed output image.

Figures 5A, 5Q:
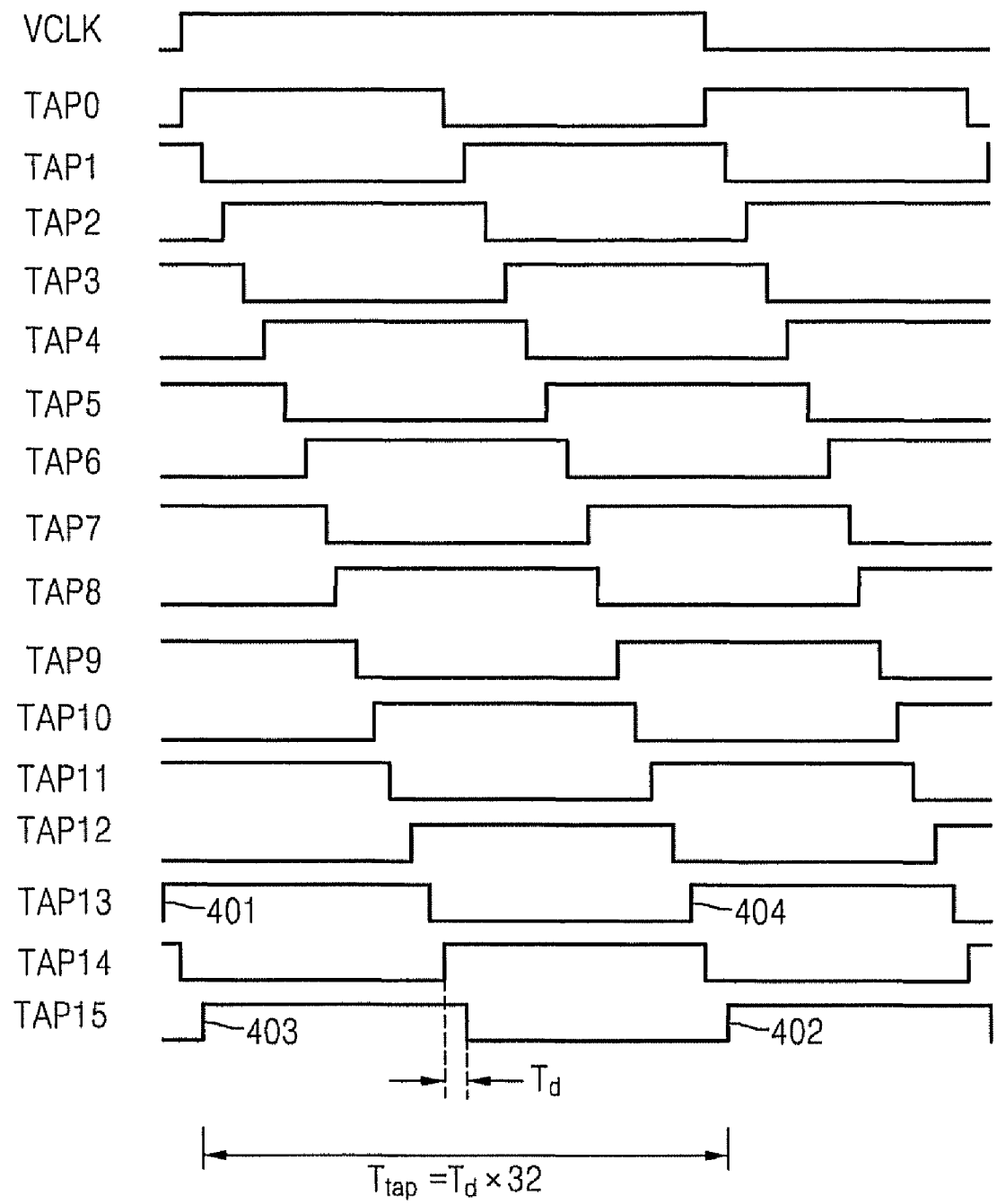
FIGS. 5A-5Q are timing diagrams illustrating tap signals according to an embodiment of the present invention.

The ring oscillator 540 provides various kinds of tap signals TAP having different timings so that the modulating unit 530 varies the pulse width. As shown in FIGS. 5B-5Q, 16 kinds of tap signals TAP0 to TAP15 have a phase difference by a set time Td and the period Ttap of the tap signals TAP0 to TAP15 is a half the period of the video clock VLCK, shown in FIG. 5A, and corresponds to 32 times the phase difference time Td. The tap signals TAP0 to TAP15 have the phase difference time Td. The tap signals are divided into 32 timings by the rising edges or the falling edges of the tap signals generated by the period Ttap.

The modulating unit 530 performs primary modulation on data images processed by the image processing unit 520 to generate video data VDO using the video clock VCLK and the horizontal synchronizing signal Hsync. If the pulse type of the primarily modulated video data VDO is repeated so that electromagnetic interference is generated, a secondary modulation of varying the frequency of the primarily modulated video data VDO is performed and secondarily modulated video data VDO-1 is output. The modulating unit 530 also includes a storage unit 531 that stores information required during the secondary modulation, though the storage unit need not be present in all aspects of the present invention.

The primary modulation refers to the operation of synchronizing the video data VDO with the video clock VCLK and the horizontal synchronizing signal Hsync to set the pulse width to correspond to the image information. The secondary modulation refers to the operation of increasing or reducing the width of the primarily modulated pulse to vary the frequency of the video data VDO when the frequency of generating electromagnetic interference is high in accordance with the type of the primarily modulated pulse. The frequency of generating the electromagnetic interference is determined to be high when the type of the primarily modulated pulse is repeated.

An example of the secondarily modulated video data VDO-1 is shown in FIG. 6D. As shown in FIG. 6D, the secondarily modulated video data VDO-1 includes an increasing period 100 in which the pulse width is larger than the pulse width of the primarily modulated video data VDO (shown in FIG. 6C), a sustain period 200 in which the pulse width is maintained, and a reducing period 300 in which the pulse width is reduced. Accordingly, the frequency of the video data VDO varies.

The increasing period 100 and the reducing period 300 are the periods in which the pulse width is increased or reduced. As described above, when the pulse width is increased or reduced, as shown in FIGS. 7C-7F, the pulse width is increased or reduced based on the pulse center line A-A of the primarily modulated video data VDO from both ends.

For example, a first pulse 101 of the increasing period 100 is increased by a first set length g1 from both ends to generate the pulse width, as shown in FIG. 7C. Since the pulse width of the first pulse 101 of the increasing period 100 corresponds to a region from a rising edge 401 of the tap signal TAP13 to a rising edge 402 of the tap signal TAP15, the pulse width is generated using the tap signals TAP13 and TAP15.

A first pulse 301 of the reducing period 300 is reduced by the first set length g1 from both ends to generate the pulse width, as shown in FIG. 7E. Since the pulse width of the first pulse 301 of the reducing period corresponds to a region from a rising edge 403 of the tap signal TAP15 to a rising edge 404 of the tap signal TAP13, the pulse width is generated using the tap signals TAP13 and TAP15.

A second pulse 102 of the increasing period 100 is increased by a second set length g2 from both ends to generate the pulse width, as shown in FIG. 7D. The pulse width is generated in the same way as the pulse width of the first pulse 101. The only difference lies in that the increased magnitude of the pulse width of the first pulse 101 is different from the increased magnitude of the pulse width of the second pulse 102. Similarly, a second pulse 302 of the reducing period 300 is reduced by the second set length g2 from both ends to generate the pulse width, as shown in FIG. 7F. The pulse width is generated in the same way as the pulse width of the second pulse 302. The only difference lies in that the increased magnitude of the pulse width of the first pulse 301 is different from the increased magnitude of the pulse width of the second pulse 302.

Video data VDO-1 of four pulse types having different pulse widths are shown in FIG. 7. The pulse types of the video data VDO-1 are set as occasion demands and the number of tap signals having different phase difference times increases as pulse types increase in order to generate the pulse types. Since the tap signals having short phase difference times must be provided in order to precisely vary the pulse width, more tap signals are required. Information related to the number of tap signals may be previously set in the storage unit 531 to be applied during the secondary modulation.

When the primarily modulated video data VDO is secondarily modulated, in the case where the pulse width varies with at least two operations of increasing, maintaining, and reducing the pulse width, the variation of the pulse width is periodically repeated. Information related to the period of the variation of the pulse width is previously set in the storage unit 531 to be applied during the secondary modulation.

Figure 8:
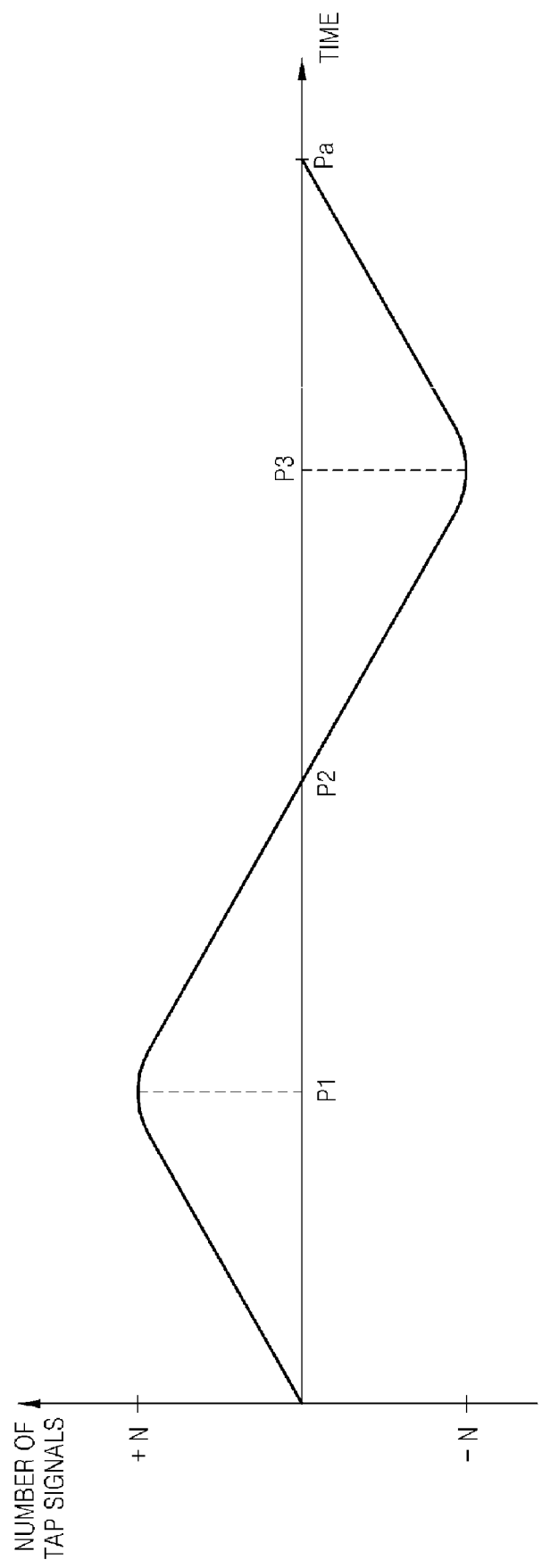
FIG. 8 illustrates the number of tap signals and a period in which the pulse width varies that are applied during the secondary modulation according to an embodiment of the present invention.

As described above, when the video data VDO are secondarily modulated, the number of taps and the periods of the variation of the pulse width that are applied to vary the pulse width are set to be plural, and the number of taps and the periods of the variation of the pulse width vary in accordance with the image information, that is, the pulse types of the primarily modulated video data VDO. As shown in FIG. 8, during the first period (an initial stage to P1), the no less than N tap signals are used to increase the pulse width so that the increased magnitude is gradually increased. During the second period (P1 to P2), the no less than N tap signals are used to increase the pulse width so that the increased magnitude is gradually reduced. During the third period (P2 to P3), the no less than N tap signals are used to reduce the pulse width so that the reduced magnitude is gradually increased. During the fourth period (P3 to Pa), the no less than N tap signals are used to reduce the pulse width so that the reduced magnitude is gradually reduced. The secondary modulation of the video data VDO is repeated every period Pa.

Figure 9:
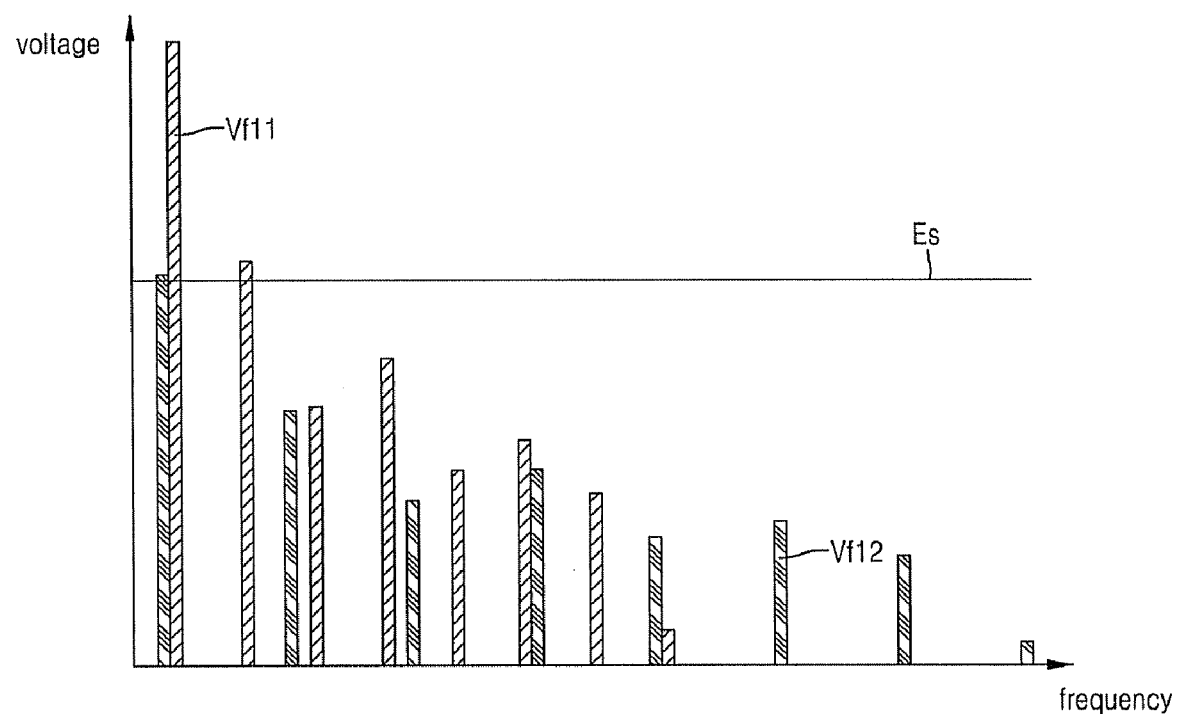
FIG. 9 illustrates the frequency spectrums of the video data before and after an embodiment of the present invention is applied.

As shown in FIG. 9, the frequency spectrum Vf11 of the primarily modulated video data VDO deviates from a reference value Es for electromagnetic interference determined by an international authority. The frequency spectrum Vf12 of the video data VDO-1 primarily and secondarily modulated according to aspects of the present invention satisfies the reference value Es.

Figure 10:
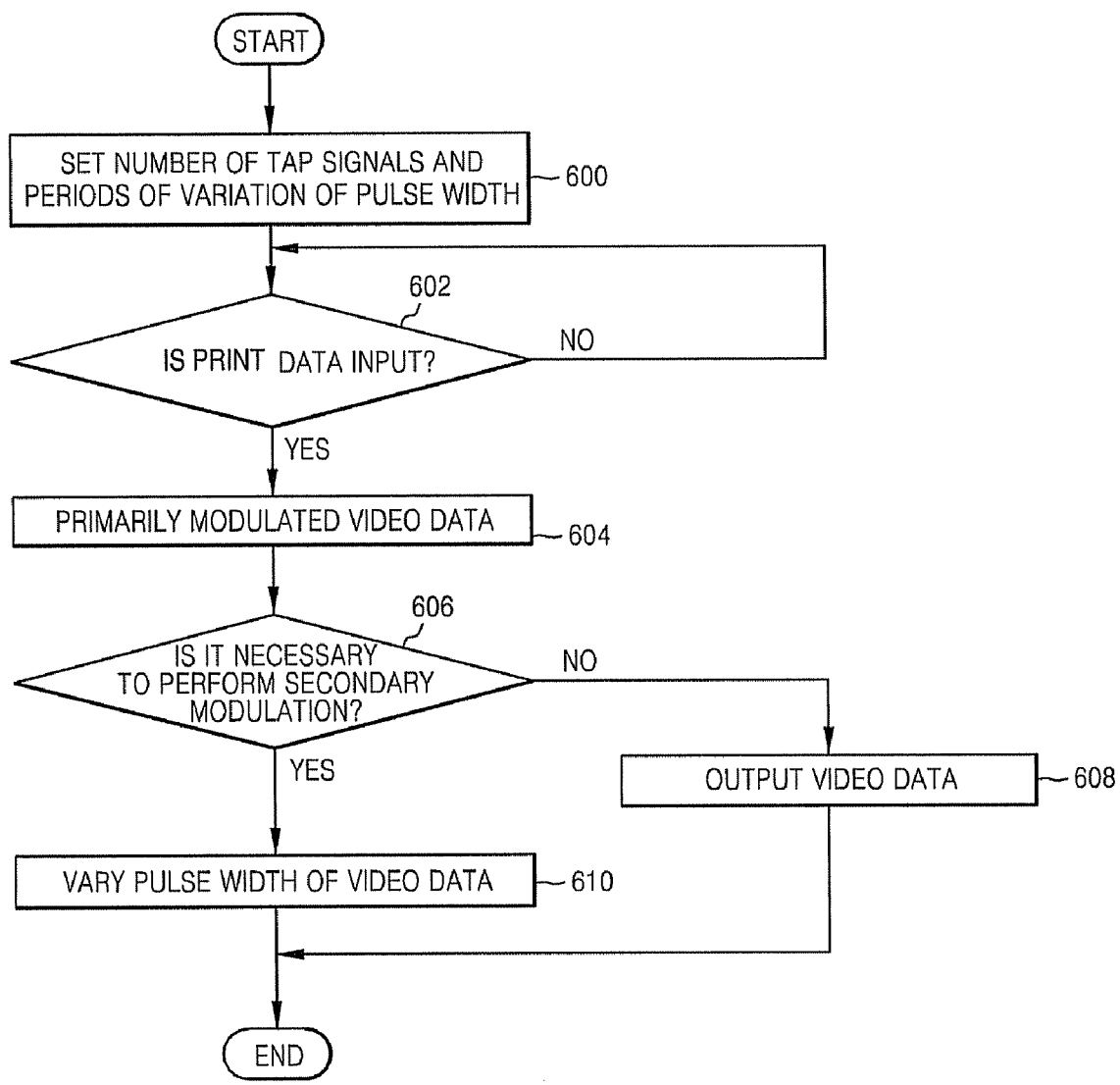
FIG. 10 is a flowchart illustrating a method of controlling an image forming apparatus according to an embodiment of the present invention.

Hereinafter, a process of controlling the image forming apparatus having the video controller improved according to an embodiment of the present invention is described with reference to FIG. 10. In relation to the secondary modulation, as described above, the number of tap signals and the periods of the variation of the pulse width that are required during the secondary modulation are previously set and the information related to the number of tap signals and the periods of the variation of the pulse width is stored in the storage unit 531 in operation 600.

Whether the print data processed by the data processing unit 40 is input to the video controller 500 is determined in operation 602. If the print data is input, the print data is provided to the image processing unit 520 through the memory 510 and the data image processed by the image processing unit 520 is provided to the modulating unit 530.

In operation 604, the modulating unit 530 synchronizes the image processed data with the horizontal synchronizing signal Hsync using the video clock VCLK, the horizontal synchronizing signal Hsync, and the radio frequency clock of the ring oscillator 540 and performs the primary modulation that sets the start and end and the pulse width of the video data VDO. The ring oscillator 540 provides the plurality of tap signals TAP having phase difference times that correspond to the number of tap signals stored in the storage unit 531 to the modulating unit 530.

In operation 606, the modulating unit 530 determines whether electromagnetic interference is generated, that is, whether it is necessary to modulate the frequency of the video data VDO based on the pulse type of the primarily modulated video data VDO. If it is not necessary to modulate the frequency of the video data VDO, the modulating unit 530 outputs the primarily modulated video data VDO as is, in operation 608.

If it is necessary to modulate the frequency of the video data VDO, then in operation 610, the modulating unit 530 increases or reduces the pulse width of the primarily modulated video data VDO using the received plurality of tap signals and the periods of the variation of the pulse width that are stored in the storage unit 531 so as to vary the frequency of the video data VDO. Secondary modulation is performed on the video data VDO, and the secondarily modulated video data VDO-1 is output.

As described above, according to aspects of the present invention, when the video data VDO is generated in synchronization with the video clock VCLK, the pulse width of the video data VDO is increased or reduced to vary the frequency of the video data VDO. Therefore, it is possible to effectively cope with electromagnetic interference whose frequency increases when the same type of pulses is repeated, so the electromagnetic interference is out of the recognition range of a user, so that the image quality can be prevented from deteriorating.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
    a data processor to generate video data; and
    a video controller to provide the video data to an exposing unit, wherein the video controller varies a frequency of the video data synchronized with a video clock and generated so as to correspond to printed image information,
    wherein the video controller increases or reduces a pulse width of primarily modulated video data to perform a secondary modulation when a pulse type of the primarily modulated video data is repeated, and
    wherein the video controller comprises:
    a ring oscillator to provide a plurality of tap signals having different phase difference times for the video clock; and
    a modulating unit to receive the tap signals and to perform the secondary modulation based on the tap signals.

2. The image forming apparatus according to claim 1, wherein the modulating unit varies the pulse width based on a pulse center of the primarily modulated video data.

3. The image forming apparatus according to claim 1, wherein, during the secondary modulation, the modulating unit combines at least two periods out of an increasing period in which the pulse width increases, a sustain period in which the pulse width is maintained, and a reducing period in which the pulse width is reduced.

4. The image forming apparatus according to claim 1, wherein the modulating unit periodically varies a pulse width of the video data during the secondary modulation.

5. The image forming apparatus according to claim 4, wherein the modulating unit comprises a storage unit to store information related to periods of variation of the pulse width.

6. The image forming apparatus according to claim 1, wherein the modulating unit comprises a storage unit to store information related to setting of a number of tap signals used during the secondary modulation.

7. The image forming apparatus according to claim 1, wherein a period of the tap signals provided by the ring oscillator is a half a period of the video clock and is a multiple of a phase difference time.

8. The image forming apparatus according to claim 1, wherein the modulating unit distinguishes timings from each other by rising edges or falling edges of the tap signals generated in the period of the tap signals.

9. A method of controlling an image forming apparatus having a video controller to provide video data to an exposing unit, the method comprising:
    performing a primary modulation to generate primarily modulated video data corresponding to printed image information using a video clock and a horizontal synchronizing signal;
    determining whether performing a secondary modulation in accordance with a pulse type of the primarily modulated video data is necessary; and
    varying a frequency of the primarily modulated video data to perform the secondary modulation if the secondary modulation is necessary,
    wherein the performing of the secondary modulation comprises:
    previously setting a number of tap signals and periods of variation of a pulse width of the primarily modulated video data to perform the secondary modulation; and
    varying the pulse width of the primarily modulated video data using the set number of the tap signals having a phase difference time for the video clock every set period.

10. The method according to claim 9, wherein the determining of whether the secondary modulation is necessary comprises determining that the secondary modulation is necessary when a pulse type of the primarily modulated video data is repeated.

11. The method according to claim 9, wherein the varying of the pulse width of the primarily modulated video data comprises combining at least two periods out of an increasing period in which the pulse width increases, a sustain period in which the pulse width is maintained, and a reducing period in which the pulse width is reduced.

12. The method according to claim 9, wherein the pulse width is increased or reduced at both ends based on a pulse center of the primarily modulated video data during variation of the pulse width.

13. The method according to claim 9, wherein the variation of the pulse width is performed in a predetermined range.

14. The method according to claim 13, wherein the set range is ¼ of a period of the video clock.

15. An image forming apparatus comprising:
a data processing unit to process print data corresponding to an image to be formed onto a printable medium;
a video controller to perform primary modulation on the print data so as to output primarily modulated video data synchronized with a video clock and a horizontal synchronizing signal, to perform secondary modulation on the primarily modulated video data if a pulse type of the primarily modulated print data is repeated, and to output the primarily modulated print data and the secondarily modulated print data; and
an image forming unit to form the image onto the printable medium based on video data received from the video controller,
wherein the video controller comprises:
a ring oscillator to provide a plurality of tap signals having different phase difference times for the video clock; and
a modulating unit to perform the secondary modulation based on the plurality of tap signals.

16. The image forming apparatus according to claim 15, wherein the secondary modulation comprises varying a frequency of the primarily modulated video data so that the frequency spectrum of the secondarily modulated video data does not deviate substantially from a predetermined reference value.

17. The image forming apparatus according to claim 15, wherein the modulating unit performs the secondary modulation by modulating the primarily modulated data so as to have at least two of a period wherein a pulse width of the primarily modulated data is increasing, a period wherein the pulse width of the primarily modulated data is maintained, and a period wherein the pulse width of the primarily modulated data is decreasing.

18. The image forming apparatus according to claim 15, wherein the modulating unit performs the secondary modulation by periodically varying a pulse width of the primarily modulated video data.

19. The image forming apparatus according to claim 18, wherein the modulation unit comprises a storage unit to store information related to the period of varying the pulse width of the primarily modulated video data.

20. The image forming apparatus according to claim 15, wherein the plurality of tap signals is not less than a predetermined number.

\* \* \* \* \*